United States Patent [19]
Padwa

[11] Patent Number: 6,100,344
[45] Date of Patent: Aug. 8, 2000

[54] AMINE FUNCTIONAL SAN

[75] Inventor: Allen R. Padwa, Worcester, Mass.

[73] Assignee: Bayer Corporation, Pittsburgh, Pa.

[21] Appl. No.: 08/992,729

[22] Filed: Dec. 17, 1997

[51] Int. Cl.⁷ ....................................................... C08F 8/32
[52] U.S. Cl. ..................... 525/382; 525/327.6; 525/329.6
[58] Field of Search ................................ 525/327.6, 382, 525/329.6

[56] References Cited

U.S. PATENT DOCUMENTS

| | | | |
|---|---|---|---|
| 3,428,596 | 2/1969 | Strand et al. | 260/41.5 |
| 5,130,378 | 7/1992 | Blum et al. | 525/327.6 |
| 5,218,055 | 6/1993 | Marrion et al. | 525/327.6 |

FOREIGN PATENT DOCUMENTS

| | | |
|---|---|---|
| 558047 | 9/1993 | European Pat. Off. . |
| 728767 | 8/1996 | European Pat. Off. . |
| 1160936 | 8/1969 | United Kingdom . |

OTHER PUBLICATIONS

Database WPI, Section Ch, Week 9413, Derwent Publications Ltd., London, GB; Class A13, AN 94–106818, XP002096681 & JP 06 056921 A (Monsanto Kasei Co.) Mar. 1, 1994.

Hendrickson, Cram & Hammond, Organic Chemistry, (month unavailable) 1970, p. 480.

Kinetics of Amine–Cyclic Anhydride Reactions in Moderately Polar Solutions by Allen R. Padwa et al, in Journal of Poly. Science Part A: Polymer Chemistry, vol. 33, pp. 2165–2174 (month unavailable) 1995.

Padwas et al, in Kinetics of Amine–Cyclic Anhydride Reactions in Moderately Polar Solutions Preprints 34, 2, 841 (month unavailable) 1993, pp. 842–843.

*Primary Examiner*—Bernard Lipman
*Attorney, Agent, or Firm*—Joseph C. Gil; Aron Preis

[57] ABSTRACT

The present invention relates to a thermoplastic polymer and more particularly to a polymer which contains structural units derived from at least one vinylic monomer and an amine group. An additional embodiment relates to the method for the manufacture of the polymer.

11 Claims, No Drawings

AMINE FUNCTIONAL SAN

FIELD OF THE INVENTION

The present invention relates to a thermoplastic polymer and more particularly to a polymer which contains structural units derived from at least one vinylic monomer and an amine group. An additional embodiment relates to the method for the manufacture of the polymer.

TECHNICAL BACKGROUND

The polymer of this invention is a compound which features amine groups in its molecular structure and cannot be directly prepared by terpolymerization. It has long been recognized that the double bonds of many vinylic monomers are highly reactive towards amines (ref.: Hendrickson, Cram & Hammond, "Organic Chemistry, 1970, p. 480) and are, therefore, not stable. For this reason, amine-containing monomers, for the most part, are not available to be used for the preparation of amine-containing polymers.

Cyclic anhydride containing thermoplastic polymers can be reacted with diamines by an imidization process to produce amine functional polymers. Unless extremely large excesses of diamine are used, some crosslinking and gel formation will result. Typically, tenfold excesses of diamine are used to minimize, but not eliminate, crosslinking.

Relevant discussions concerning the kinetics of amic-acid formation and imidization of polymeric and small molecule mixtures measured by Fourier-Transform IR spectroscopy at near ambient and elevated temperatures were disclosed in Kinetics of Amine-Cyclic Anhydride Reactions in Moderately Polar Solutions by Allen R. Padwa et al in Journal of Poly. Science Part A: Polymer Chemistry, Vol 33, 2165–2174 (1995).

Also, the reaction of amine and anhydride functionalities were reported to be sensitive to the environment of the functional group. In accordance with Padwa et al, in Kinetics of Amine-Anhydride Reactions for Reactive Processing, Polymer Preprints 34,2, 841 (1993), extrapolation from low molecular weight chemistry to polymer bound functionalities are not necessarily a sound basis for choice of functionality. Reactive melt-processing of poly(styrene-co-maleic anhydride) with primary amine was reported in an article by Vermeesch et al in Journal of Poly. Science Vol. 63, 1365–1378 (1994).

It is the objective of the present invention to produce amine functional thermoplastic polymers. It is the further objective to describe an extrusion process to efficiently produce said polymers.

DETAILED DESCRIPTION OF THE INVENTION

The polymer of the invention (herein "terpolymer") contains secondary amine functional groups and structural units derived from at least one vinylaromatic monomer and from at least one polar monomer. It is characterized in that the weight ratio of the structural units derived from the vinyl aromatic monomer to the units derived from the polar monomer is about 95:5 to 50:50 and in that the amine structural units are present in the terpolymer as 0.5 to 15% relative to the total weight of the structural units derived from the vinylaromatic monomer and from the polar monomer.

The terpolymer is suitable as a compatibilizer in thermoplastic blends containing polycarbonate resins.

This terpolymer may, in accordance with the invention, be prepared by a multi-step process. In the first step, a precursor is prepared by reacting:

(i) a vinyl aromatic monomer,
(ii) a polar monomer, and
(iii) an $\alpha,\beta$-dicarboxylic acid-containing olefin monomer.

This step may be carried out by any of the conventional polymerization methods, including bulk or solution polymerization techniques which are well known in the art.

In a subsequent step, the precursor is reacted with a sufficient amount of a compound which contains two amine groups, a difunctional amine (herein "DFA"), which differ one from the other in terms of their respective reactivity towards the $\alpha,\beta$-dicarboxylic acid moiety of (iii). The reaction of this subsequent step may be carried out in a solvent such as dimethylformamide or N-methyl-pyrrolidone, or the like, under conventional imidization conditions. However, carrying out this reaction in an extruder, without solvents, is advantageous since it obviates the need to recover large amounts of solvent. Preferably, the molecule of the DFA contains a primary and a secondary amine group. Preferably, the two amine groups differ one from the other in terms of their reactivities relative to the acid moiety by at least 2 to 1.

The reaction product of the subsequent step is the inventive terpolymer, the structure of which features pendant amine groups. Due to the difference in the reactivities of the amine groups of the DFA, at moderate molar excesses, preferential reaction of the more reactive amine occurs with all of the $\alpha,\beta$-dicarboxylic functional groups.

After the completion of the reaction, the excess of DFA may be removed by any conventional method to render the terpolymer essentially free of non-polymer-bound amines. These amines may be removed by a polymer solution-precipitation process, or more conveniently, by vacuum devolatilization from the molten polymer. The later process step may be carried out in a vacuum-vented extruder. Advantageously, the contents of the non-polymer-bound amine is reduced to as low a level as possible, preferably to a level less than about 10%, most preferably less than about 5% relative to the weight of the polymer-bound amine, so that it does not compete with the polymer-bound amines during subsequent use of the inventive polymer.

The molecular structure of the resulting, inventive terpolymer contains about 5 to 40% of units derived from the polar monomer (ii), 0.1 to 30% of units derived from group (iii) the remainder units having been derived from group (i), the percents relating to the weight of the terpolymer.

Suitable vinylaromatic monomers of group (i) include styrene; alpha-alkyl monovinyl monoaromatic compounds, such as alpha-methyl styrene, alpha-ethyl styrene, alpha-methyl vinyltoluene, etc.; as well as ring-substituted alkyl styrene such as vinyl toluene, o-ethylstyrene; p-ethylstyrene; 2,4-dimethylstyrene, and the like; ring-substituted halo-styrene, such as o-chlorostyrene, p-chlorostyrene, o-bromostyrene, 2,4-dichlorostyrene, and the like; ring-alkyl, ring-halo-substituted styrenes, such as 2-chloro-4-methylstyrene; and 2,6-dichloro-4-methylstyrene.

Suitable polar monomers of group (ii) include acrylonitrile, methacrylonitrile, ethacrylonitrile and $C_1$ to $C_4$ alkyl (meth)acrylate.

Suitable $\alpha,\beta$-dicarboxylic acid-containing olefin monomers of (iii) include maleic acid, fumaric acid, itaconic acid, citraconic acid, their anhydrides and their monoalkyl esters.

Suitable examples of DFA are 1-(2-aminoethyl) piperazine, (herein "AEP"), N-alkyl alkylene diamines, N-alkoxy alkylene diamines, and the like.

The inventive process requires that the level of DFA be in molar excess over the level of $\alpha,\beta$-dicarboxylic functionality to prevent crosslinking. As a result, one mole of $\alpha,\beta$-dicarboxylic functionality yields one mole of pendant amine functionality.

The resulting terpolymer is additionally characterized in its thermoplastic properties and in that its number average molecular weight is at least 20,000 and most preferably about 20,000 to 100,000.

An additional embodiment of the inventive process allows control of the final amount of amine functionality without the necessity of varying the precursor composition. The level of pendant secondary amine may be reduced by using a mixture of DFA and monofunctional amine (MFA) which exhibits reactivity towards anhydride similar to that of DFA. More specifically, the MFA is selected so that the reactivity of the MFA towards the $\alpha,\beta$-dicarboxylic functionality is similar to the amine of the DFA which exhibits greater reactivity. The quantity of DFA plus MFA is chosen so that the total moles of DFA plus MFA is greater than the amount of $\alpha,\beta$-dicarboxylic functionality.

An example of such a pair of molecules is AEP for the DFA and 4-(2-aminoethyl) morpholine for the MFA.

The inventive terpolymer has been characterized as to its molecular weight (gel permeation chromatography), amine content (by titration in tetrahydrofuran with perchloric acid in methanol as titrant) and residual, unbound amine levels (by gas chromatography).

The invention is further illustrated but is not intended to be limited by the following examples in which all parts and percentages are by weight unless otherwise specified.

EXAMPLES

Experimental

Example 1
Synthesis of precursor:

A mixture of 49.8 parts styrene, 29.1 parts acrylonitrile, 0.8 parts maleic anhydride, 20 parts methylethyl ketone, 0.105 parts t-butyl-2-ethyl-hexyl peroxycarbonate (peroxide initiator), and 0.25 parts isooctyl thioglycolate (chain transfer agent) were fed to a continuously stirring reactor operating at 145° C. at a rate necessary to give a 45 minute residence time. The level of solids in the reactor of about 45% is achieved at a steady state and the polymer solution is continuously devolatilized to yield a precursor of composition 67:32:1 styrene:acrylonitrile:maleic anhydride, having an intrinsic viscosity (MEK, 25° C.) of 0.45 dl/gm.

Example 2

In a yet different method, a mixture of 66.3 parts of styrene, 32.5 parts of acrylonitrile, 1.1 parts of maleic anhydride and 0.13 parts of terpinolene was fed into a reactor operating at 170° C., at a rate necessary to give 105 minutes residence time. The resultant polymer solution was continuously devolatilized to give a polymer essentially identical to that which was prepared in accordance with Example 1.

This precursor contains 0.93 wt % maleic anhydride and has a titer of 0.19 mmoles per gram.

Example 3
Synthesis of amine functional terpolymer:

The precursor prepared in Example 2 was fed to a 34 mm Leistritz co-rotating twin screw extruder fitted with an injection port, a vacuum vent devolatilization zone, and a die face pelletizer. The extruder was operated at 150 RPM and 260° C. with a vacuum of 5 to 50 mm Hg. The precursor was fed at a rate of 9.1 kg/hr. The DFA, 1-(2-aminoethyl)-piperazine, was pumped to the injection port at rates from about 1.25 to 2.0 moles per mole of anhydride or 2.5 to 4.0 ml/min. The results of these experiments are shown in the table.

TABLE

| Example | DFA[1] | Power[2] | Titer[3] | Residual DFA % | Mn[4] | Mw[4] |
|---|---|---|---|---|---|---|
| Control | 0.0 | 11 | — | 0.0 | 56.6 | 119 |
| A | 2.0 | 11 | 0.22 | 0.20 | 44.5 | 107 |
| B | 1.5 | 12 | 0.21 | 0.07 | 45.5 | 116 |
| C | 1.25 | 11–20 | 0.22 | 0 | NA[5] | NA |
| D | 1.5 | 11 | 0.19 | 0.002 | 47.0 | 108 |

Notes:
[1] the amount of the difunctional amine (AEP) is noted in moles per mole of anhydride; in Example D, the DFA is an equimolar mixture of AEP and 4-(2-aminoethyl)morpholine.
[2] extruder power draw measured in amps
[3] titer in mmoles per gram of polymer corrected by subtracting titer due to residual amine.
[4] molecular weights are in kg/mole
[5] sample could not be run due to gels The precursor served as control. Example A shows the operation with a large excess of DFA: 2 moles DFA per mole of anhydride. The extruder could not adequately devolatilize the excess DFA that remains after the reaction, resulting in high level of residual DFA. The high levels of residual DFA are undesirable in the subsequent use of the inventive terpolymer as a compatibilizing agent.

In Example B, the level of added DFA (1.5 moles per mole of anhydride) caused a decline in the level of residual DFA, which is reduced to levels well below the titer. The precursor has been completely reacted and the resulting polymer has very low levels of residual DFA. The molecular weight, within experimental error due to change in the molecular structure, is unchanged from that of the precursor.

In Example C, the DFA level (1.25 moles per mole of anhydride) resulted in the formation of polymer gels due to crosslinking and unstable extruder operation. This is indicated by fluctuations in extruder power over the range of 11 to 22 amps and the presence of polymeric gels; the measurement of molecular weight was not possible.

In Example D, a mixture of DFA and a monofunctional amine further demonstrates the invention. The titer is reduced to a range of expected levels. The theoretical titer at 50% DFA charged is 0.16. The polymer molecular weight is unchanged indicating that the polymer has been reacted with no crosslinking.

Additional experiments were carried out as described above using cyclic anhydride modified styrene-ethylenebutylene-styrene triblock polymers (maleated Kraton rubbers, available commercially from Shell Chemical Co.). Polymers containing approximately 0.5, 1.0, and 1.8 weight percent maleic anhydride were reacted with 1.5 moles 1-(2-aminoethyl)piperazine per mole of cyclic anhydride under conditions as described above. In all these experiments, no conversion of the cyclic anhydride to secondary amine had occurred. When reacted in a solvent for the polymer (tetrahydrofuran), complete reaction of the cyclic anhydride was obtained. These experiments point to that the polymer backbone must contain a polar monomer to achieve reaction during melt processing.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a thermoplastic amine-functional terpolymer comprising
   a) reacting:
      (i) a vinyl aromatic monomer,
      (ii) a polar monomer, and
      (iii) an $\alpha,\beta$-dicarboxylic acid-containing olefinic monomer to obtain a precursor, and
   b) reacting said precursor with a molar excess of a reactant comprising difunctional amine, having two amine groups which differ one from the other in terms of their respective reactivities towards said (iii), to obtain a terpolymer, said molar excess being greater than 25% relative to the moles of said (iii), said (b) carried out solvent-free.

2. The process of claim 1 wherein said reactant further contains a monofunctional amine.

3. The process of claim 1 wherein said (i) is selected from the group consisting of styrene, alpha methyl styrene and paramethylstyrene.

4. The process of claim 1 wherein said (ii) is selected from the group consisting of (meth)acrylonitrile and $C_1$ to $C_4$ (meth)acrylic acid esters.

5. The process of claim 1 wherein said (iii) is selected from the group consisting of maleic acid, fumaric acid, itaconic acid, citraconic acid, their anhydrides and their monoalkyl esters.

6. The process of claim 1 wherein said (ii) is maleic anhydride.

7. The process of claim 1 wherein said reactant is selected from the group consisting of 1-(2-aminoethyl)piperazine, N-alkyl alkylene diamine and N-alkoxy alkylene diamine.

8. The process of claim 1 wherein said reactant is 1-(2-aminoethyl)piperazine.

9. The process of claim 1 wherein (iii) is present in an amount of 0.1 to 15% relative to the total weight of (i)+(ii).

10. The process of claim 1 wherein said difunctional amine contains a primary amine group and a secondary amine group.

11. The process of claim 1 wherein reacting, both occurrences, is in an extruder.

* * * * *